US009509395B2

(12) United States Patent
Klippert et al.

(10) Patent No.: US 9,509,395 B2
(45) Date of Patent: Nov. 29, 2016

(54) WIRELESS SOFTWARE DIALER AND MESSAGING HEAD

(71) Applicants: Chad Klippert, Victoria (CA); Timothy Curtis, Brentwood Bay (CA); Mark Insley, Victoria (CA); Bradley Head, Victoria (CA)

(72) Inventors: Chad Klippert, Victoria (CA); Timothy Curtis, Brentwood Bay (CA); Mark Insley, Victoria (CA); Bradley Head, Victoria (CA)

(73) Assignee: Latitude Technologies Corporation (CA)

( * ) Notice: Subject to any disclaimer, the term of this patent is extended or adjusted under 35 U.S.C. 154(b) by 0 days.

(21) Appl. No.: 14/762,188

(22) PCT Filed: Mar. 10, 2013

(86) PCT No.: PCT/IB2013/051884
§ 371 (c)(1),
(2) Date: Jul. 20, 2015

(87) PCT Pub. No.: WO2014/140686
PCT Pub. Date: Sep. 18, 2014

(65) Prior Publication Data
US 2015/0372749 A1 Dec. 24, 2015

(51) Int. Cl.
H04W 4/00 (2009.01)
H04B 7/185 (2006.01)
H04W 84/06 (2009.01)
H04L 29/08 (2006.01)
H04W 4/14 (2009.01)
H04B 1/034 (2006.01)
H04M 3/00 (2006.01)
H04W 40/00 (2009.01)
H04W 4/12 (2009.01)

(52) U.S. Cl.
CPC .......... *H04B 7/18508* (2013.01); *H04L 67/12* (2013.01); *H04W 4/14* (2013.01); *H04W 84/06* (2013.01); *H04W 4/12* (2013.01)

(58) Field of Classification Search
CPC ......... H04B 1/034; H04B 1/02; H04W 4/00; H04W 40/00; H04W 84/06; H04M 3/00; H01B 7/18506; H01B 7/18508; H01B 7/18513
USPC .......................................................... 455/98
See application file for complete search history.

(56) References Cited

U.S. PATENT DOCUMENTS 8,353,006 B2 * 1/2013 Lynch ................. H04W 84/005
726/2
2008/0204268 A1 * 8/2008 Dowling ................. H05B 37/02
340/815.45

OTHER PUBLICATIONS

International search report issued by the ISA/CA in PCT/IB2013/051884 on Nov. 21, 2013 (3 pages).

* cited by examiner

*Primary Examiner* — Huy C Ho
(74) *Attorney, Agent, or Firm* — Baumgartner Patent Law; Marc Baumgartner

(57) ABSTRACT

Provided is a system and device, and for use with a satellite for communicating between a vehicle and a base station. The system comprises a peripheral device, an access point to link the peripheral device to an onboard satellite communication device, and the onboard satellite communication device. The device is programmable, has a software dialer, and a messaging controller for the onboard satellite communication device. Also provided is a method for communicating between a vehicle and a base station.

20 Claims, 1 Drawing Sheet

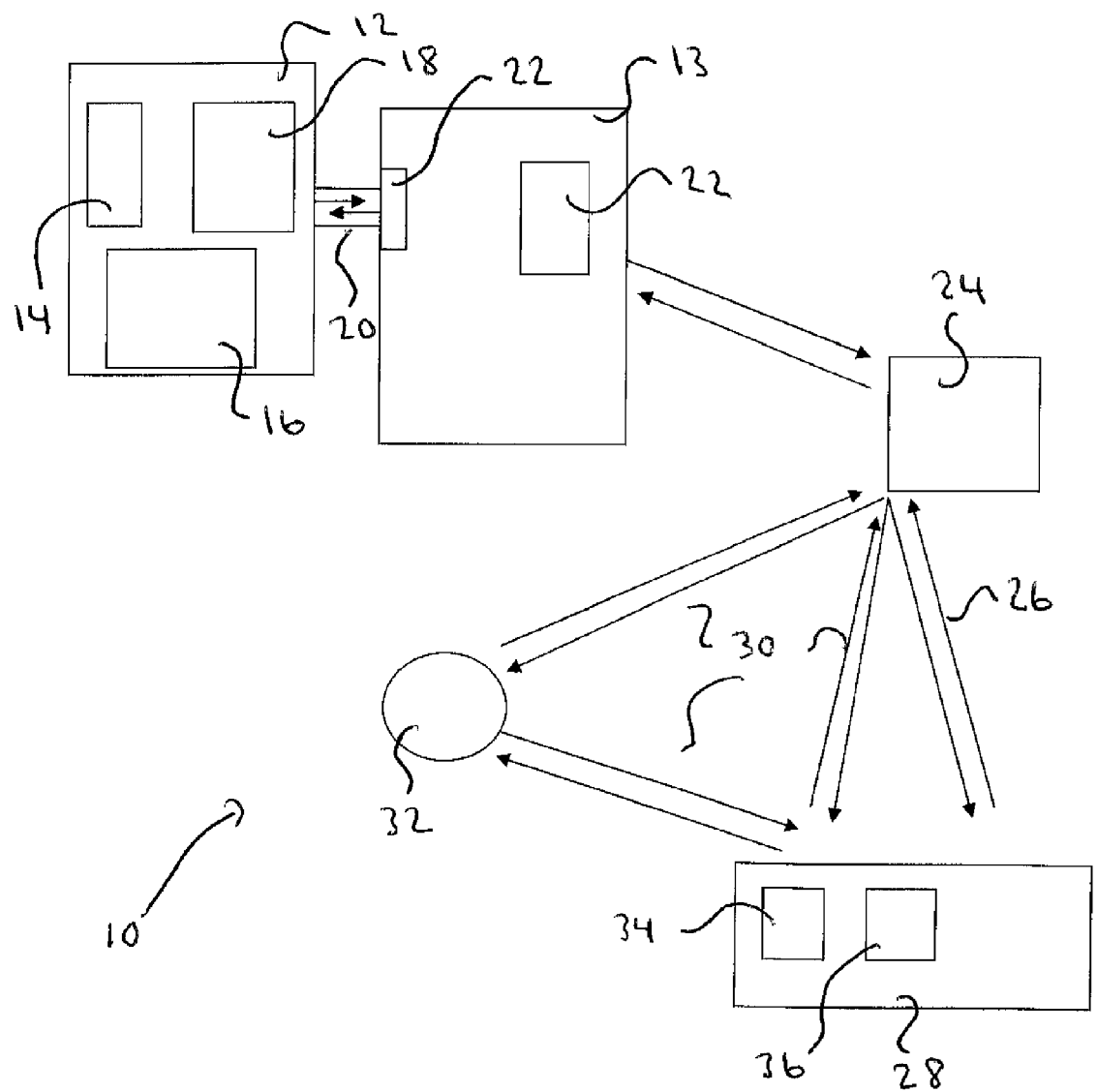

WIRELESS SOFTWARE DIALER AND MESSAGING HEAD

CROSS REFERENCE TO RELATED APPLICATIONS

This present invention is filed under 35 U.S.C. §371 as the U.S. national phase of International Application No. PCT/IB2013/051884, filed Mar. 10, 2013, which designated the U.S. and which is hereby incorporated in its entirety including all tables, figures, and claims.

FIELD

The present technology relates to a controller for a communication system for use in vehicles. More specifically, it relates to a software-based system and device for use in aircraft that provides the ability control a satellite communication device.

BACKGROUND

In recent years, there has been rapid development of new communication systems and methods of communicating. The early cellular phones were limited to analogue operation, communicated specifically over a cellular network and allowed for voice communication only. Later, digital operation was introduced and soon thereafter, the keypads were utilized to provide rudimentary text messaging. Modern wireless devices, including cell phones have sufficient bandwidth to enable the transfer of voice signals, image data, and even video streaming. In addition, most cell phones provide network access, such as Internet access through network interfaces such as Wi-Fi, Bluetooth® and WiMax, for example. This allows the cell phones to communicate with other electronic devices.

Satellite communication and satellite phones have also undergone a transformation in recent years. The phones provide similar functionality to cellular phones including voice communication, short messaging service and low-bandwidth Internet access.

In truly mobile situations, such as in an aircraft, communication usually involves a satellite and a satellite network. Data are sent from the mobile location by an onboard satellite communication system. The satellite network may then communicate data to a base station directly, or, as is the case more recently, communicate data via the internet to the base station.

While these communication means are providing ever-expanding capabilities, they cannot always provide reliable communication. This is in part because of the bandwidth available, the size of the data being sent, and the reliability of the system to accurately transform the data. Another deficiency is the ability to meld the technologies together, so that a mobile device can interact with the onboard satellite communication system, thereby accessing satellite-based communications.

It is an object of the present technology to provide a peripheral device, system and method that can reliably and accurately control a satellite communication (satcom) device by sending commands to the device. The peripheral device additionally can transmit text and binary messages to the onboard satellite communication system and then to a recipient device or base station. It is a further objective to provide this service without the use of specific hardware keypads and screens that are purpose built but rather with a multifunctional peripheral device that is easy to use and has extensible protocols for command controls.

SUMMARY

While various exemplary embodiments are discussed and contemplated herein, the present disclosure provides many concepts that can be embodied in a wide variety of specific contexts. The specific embodiments discussed herein are therefore, merely illustrative of specific ways to make and use the invention as ultimately claimed and are not meant to limit the invention in any way. Accordingly, for the ease of discussion, communication systems, methods and device embodiments are described below, as exemplary embodiments, and the description of specific exemplary embodiments is not intended to limit the exemplary embodiments disclosed herein.

The present technology provides a programmable peripheral device for linking to a satellite communications phone, the programmable peripheral device comprising software, a software keypad, and a messaging tool. This offers significant improvements over the existing technology, as there is no requirement for specific hardware or purpose built screens, but rather, the device relies upon software to control a satellite communication device to dial, redial, code data and send data to the satellite communication device. The programmable peripheral device further comprises an extensible protocol for command controls. In addition, it has protocols for data transfer, including messaging, texting, and Short Message Service (SMS), allowing for greater flexibility in communications. In order to reduce the size of data being sent, the extensible data transfer protocol provides for canned messages, form messages and hybrid messages to decrease the size of transmitted data.

The peripheral device is a smart phone or a tablet computer. It communicates to the onboard satellite communication device sending commands to the device and sending and receiving data from the onboard satellite communication device. The peripheral device is generally for use in aircraft, including both fixed wing and helicopter, but may be for ground transportation as well.

A system for use with a satellite for communicating between a vehicle and a base station is also provided. The system comprises a peripheral device, an access point to link the peripheral device to an onboard satellite communication device, and the onboard satellite communication device, wherein the peripheral device is programmable, has a software dialer, and a controller for the onboard satellite communication device. The access point is selected from the group consisting of Wi-Fi to a serial dongle, a Bluetooth® to a serial dongle, a Universal Serial Bus (USB) to a serial wired connection, and a Bluetooth to Wi-Fi direct, with the onboard satellite communication device having a modem for this connection or is Wi-Fi to the serial dongle. The peripheral device communicates to the onboard satellite communication device sending commands to the onboard satellite communication device and sending data to and receiving data from the onboard satellite communication device using firmware or software in the system. As the peripheral device comprises an extensible protocol for command controls and also for data transfer, including messaging, texting, and Short Message Service (SMS), it is a very flexible system. The peripheral device is a smart phone or a tablet computer, and is therefore very easy to use. In general, the vehicle is either a fixed wing aircraft or a helicopter but may be ground vehicle.

A method of controlling and communicating with an onboard satellite communication device is also provided. The method comprises:
using an extensible protocol for command controls; and
transferring data, including messaging, texting, and Short Message Service (SMS).

The method is controlled by a peripheral device with an access point to link the peripheral device to the onboard satellite communication device. The access point is Wi-Fi with a serial dongle. The method includes modifying the extensible protocol in order to meet changing requirements. As the method is executed by the peripheral device without the assistance of specific hardware and purpose built screens, it is very easy to do.

A method of communicating between a vehicle and a base station is also provided. The method comprises:
employing a peripheral device comprising software or firmware, a software dialer and messaging head to control a satellite communication device;
transferring data between the peripheral device and the satellite communication device;
transferring data between the satellite communication device and a satellite;
transferring data between the satellite and the base station; and
decoding the data.

If needed, the method includes decreasing the size of the data prior to transferring it from the peripheral device to the satellite communication device. At least some of the data are transmitted from the peripheral device as canned messages or form messages. As the software or firmware has extensible protocols, it is a very flexible method, allowing for modification of a protocol.

A device comprising a non-transitory computer-readable medium, having stored thereon a computer program for data communication is also provided. The computer program has a plurality of protocols, the protocols being extensible, the protocols executable by a processor to cause the device to perform the steps of: controlling a satellite communication device; dialing the satellite communication device; sending data to the satellite communication device; and receiving data from the satellite communication device.

FIGURES

FIG. 1 is a block diagram of the system of the present technology.

DEFINITIONS

Dongle: A dongle is a piece of hardware that attaches to a computer and allows a piece of secured software to run. The device does not contain the software in its entirety, but rather is an electronic key that unlocks the program on a computer.

SMS: Short Message Service. The primary motivation for the creation and use of SMS language was to convey a comprehensible message using the fewest number of characters possible.

TCP/IP: Transmission Control Protocol (TCP) and Internet Protocol (IP).

OS: A mobile operating system.

ATTN: Attention, a command character to signal a device request. A common use for ASCII control character known as BEL or Bell, hex 0x07 is used to signal attention to a device.

CRC: Cyclic redundancy checksum. A method of ensuring data is intact and unmodified. The CRC word is part of the CRC'ed data.

MSGID: Message identifier, or type a message identifier is assigned to each message—defines semantic meaning.

SUBID: Subordinate identifier of the message, further defining the message semantic meaning.

ACK: Acknowledgement byte, specifically in this case we reference the ASCII control character set. ACK, hexadecimal 0x06 (decimal 6).

NAK: Negative acknowledgement byte, specifically in this case we reference the ASCII control character set, NAK, hexadecimal 0x15 (decimal 21).

Wi-Fi: A technology allowing devices to exchange data wirelessly over a computer network, including hi-speed Internet connections. It is any wireless network based on Institute of Electrical and Electronic Engineers (IEEE) 801.11 standards.

WLAN: Wireless Local Area Network.

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and components similar or equivalent to those described herein can also be used, the acceptable methods and components are now described.

System

The main components of the communication system for soft wireless dialing and messaging, generally referred to as 10, is shown in FIG. 1. A peripheral device 12 connects to the onboard satellite communication system, or integrated aeronautical communications device 13. It has software 14, a software keypad 16 and a messaging tool 18. The device may be, but is not limited to an iPad®, an iPhone® and an Android® device. The onboard satellite communication device 13 generally supports narrow band networking for aircraft requiring text messaging, email, file transmitter, internet access and voice communication and therefore it is a data and voice satellite communication device that has the firmware or software in the unit to support the protocol. It need not support voice communication. The connection is a Wi-Fi to serial dongle, which provides an "access point" 20 that the mobile device 12 then connects to using its built-in Wi-Fi, or is a Bluetooth® to serial dongle, or a Universal Serial Bus (USB) to serial wired connection, or is a Bluetooth to Wi-Fi direct, with the onboard satellite communication device 13 having a modem for this connection. Software or firmware applications 14 in the peripheral device 12 communicate to the onboard satellite communication device 13 over TCP/IP sockets 22 sending commands to the onboard satellite communication device 13 using firmware or software 22 in the communication device 13. Note that error detection is inherently part of the transmission protocol. The onboard satellite communication device 13 communicates with a satellite 24, which in turn transmits via a satellite network 26 either directly to the base station 28 or via the Internet 30 to the recipient device (base station) 28 or to a cloud 32 and then the base station 28, where the data are decoded. The communication system 10 provides the connectivity required for reliable text and binary messaging utilizing a processing device 34 with software or firmware 36 at the base station 28, to provide the base station applications, and the peripheral device 12 applications communicating with onboard satellite communication system 13. This allows for a user to dial the peripheral device 12, answer the peripheral device 12, receive and send 'canned messages' and receive, send general short-burst satellite data and SMS.

Commanding and Controlling the Satcom Device

A user inputs numbers into the peripheral device 12 using the software keypad 16, as would be known to one skilled in the art. The software or firmware applications 14 in the peripheral device 12 include instructions or protocols to instruct the peripheral device to perform a number of functions, including controlling a satellite communication device by sending commands, dialing the satellite communication device, sending data to the satellite communication device, and receiving data from the satellite communication device. By using a peripheral device to control the satellite communication device, there is no requirement for specific hardware or purpose built screens, but rather, the device relies upon software to control a satellite communication device.

As would be known to one skilled in the art, the peripheral device would request system information from the satellite communication device in order to connect to it before providing commands.

As would be known to one skilled in the art, the satcom device is used to determine position by communicating with a Global Positioning Satellite and to then send that data. As the peripheral device controls the satellite communication device, it therefore controls when the position is determined, when the position is reported, where it is reported to and how it is reported. This may include commanding the satellite communication device to trigger emergency tracking mode.

Also, as would be known to one skilled in the art, the peripheral device, in order to function in an acceptable manner, would constantly monitor for data sent from the peripheral device and regularly query the device for new messages, position, signal strength and notifications such as a new message or text notification, message or text queued, message or text not queued, report transmitted, report queued, report not transmitted.

Further, as would be known to one skilled in the art, as the peripheral device controls the satellite communication device, when a user wants to send and receive text messages, the peripheral device controls the placing and receiving of satellite phone calls on the satellite communication device. This would include requesting the start of a call, requesting the end of a call, requesting call status (ringing, calling, idle and the like)

Telephony Dialing Control Message Format

Message Format

Canned Messages and Form Messages are used as a method to decrease the overall size of transmitted data. Canned Messages allow a single byte to transmit a message based on a lookup table. Form Messages, like Canned Messages, allow several user adjustable fields to be transmitted using a minimum data transmit size. Both Canned Messages and Form Messages require synchronization between the peripheral device 12 and the base station 28 to maintain a common context for a given message code, or form field. The administration of this synchronization is handled via the base station 28.

A special case of Canned Messages, referred to as Hybrid messages, allow additional user-defined data to be tagged with a Canned Message, like a single-field Form Message.

Payload Structure

In order to build a functional interface that utilizes the 3P messages (a general purpose wrapper message control that allows third party messages to be carried outside the more specific payload inside) and provides a suitable amount of information for proper decoding of the message, a payload structure is required.

Content Control Byte

The Payload structure utilized by this interface is dynamic in nature with a Content Control Byte (CCB) at the start to guide the decoding of the message. Following the CCB, the payload structure will vary greatly; hence the payload structure will be provided based on the particular Specialized Peripheral Identification field value.

File Payload

File payloads have the least amount of structure constraint applied to them. The file payload type is used for any message that does not meet the other three defined types.

A specific use of the file payload type is for sending large files that require spanning across multiple transmissions. In this case, file payloads may be broken up into multiple messages. For example, each message starts with a content control byte, content-counter byte and file id byte. The counter is the lower 7 bits; if the highest bit is set the current byte indicates the current count is the highest value to expect. The file id byte is used to differentiate between multiple file parts from different file sources.

Once all file payloads have been received and reassembled, the first part of the payload is an internal header followed by the actual file.

Text Payload Type

Freeform messages for person-person communication utilize this type. The payload may start with an optional email address, followed by a vertical bar character, followed by the text of the message.

Canned (pre-defined) Payload Type

As a method of decreasing the amount of data transmitted for a customer, binary codes can be transmitted in lieu of including the entire textual intent of a message. Canned messages may be administered through the base station and or any peripheral device. The messages are stored and may be 5 messages, or 9 messages, or 20 messages or more, or any number between and will be limited by the ability of the user to rapidly and accurately identify and use a specific message.

Form Payload Type

The peripheral device firmware or software may store forms. These may be upgradeable through a configuration interface. The use of forms allows for compact transmission of several adjustable fields to the base station.

Content Control Byte—Forwarding and Display

For these two bits, the user can control the destination of messages. They can choose to send to an email address, a base station, a preconfigured email address, or a combination of the three.

Content Control Byte—Specialized Peripheral Identification

This field (SPI) allows further distinguishing of the following data. The field consists of 4 bits allowing for 16 global "types" of peripheral. If messages are compressed by the messenger, two of the values will be used for the messenger.

Unified Onboard Satellite Communication System Data Format

The Unified Onboard Satellite Communication System Data Format captures any generic event generated by an onboard satellite communication system rather than consuming the remaining Specialized Peripheral ID (SPI) values. The events captured by the onboard satellite communication system are all based on ground-based communications methods.

The use of this SPI value requires subsequent data structuring constraints, as depicted in FIG. 2. For FIG. 2, the fields are defined in the following four sections:

Peripheral Serial Number

There may be multiple peripherals attached to an onboard satellite communication system. To prevent confusion at the ground-based servers, each reporting peripheral should include its serial number.

Short Configuration Revision

Each time a configuration file is updated in an onboard satellite communication system, a 4-byte Configuration Revision (unique identifier) is included with the update. The bottom byte (LSB) of the Configuration Revision allows for a shortened version of the unique identifier. This field allows the ground-based servers to identify which configuration settings were used by the device when the message was generated.

Event ID

The Event ID is assigned by the Configuration Manager on a per event, per unit basis. There are no pre-defined values for Event ID's.

Variable Length Data Fields

Since the ground-based servers are aware of the data fields to be reported with a given message, these data fields can vary in length. The specific combination of Short Config Revision (SCR) and Event ID (EVT) result in a definition of message length.

Text Messaging Peripheral Payload Structure

Most of the possible fields in the payload structure for text messaging peripherals are optional depending on the context, but their location with respect to the other fields is constant. Every message issued over this interface will contain, in conjunction with the Content Control Byte, either a set of Canned Message/Form information or a message body.

Canned Message & Form Information

For Canned messages, the Canned Message ID will immediately follow the Content Control Byte. As it is possible to include additional information to a canned message (also known as a hybrid canned message) the additional data will immediately follow the Canned Message ID.

The nature of the Canned Message ID indicates to the base station whether a given canned message includes hybrid data.

For Form messages, the Form Message ID will immediately follow the Content Control Byte. It is assumed that Form messages contain multiple user adjustable fields. As form context and content (i.e. number of fields, specific content of each field) will need to be synchronized between the peripheral application and base station application, the field data can be simply provided with delimiters between the individual fields.

Input/Output (I/O) Expansion Module Payload Structure

The design of the payload structure for I/O Expansion modules is dynamic with control information defining what data is packaged into the payload. Each message from this peripheral includes a Message Reason Code (located immediately following the CCB). The data that follows is partially controlled by the Message Reason Code but is generally be split up into 3 byte chunks containing pre-selected portions of gathered data.

Mobile Originated Payloads

The mobile originated (MO) payload structures are the most varied to support the widest range of potential uses of this interface.

MO Payload

Mobile Terminated Payloads

The overall structure of Mobile Terminated (MT) payloads remains unchanged, but some of the fields have a different context. Since there is a single end point device (the satcom peripheral application) that is the target for a MT target message, the use of the Forward Enable bit of the Content Control Byte is irrelevant. The Forwarding/Source Inclusion bit is used to indicate whether the received message originated from the primary sending system, or somewhere else. If the message was simply forwarded by the primary sending system, the Email Forwarding/Source Address field will contain the source address. The satcom peripheral application can then use this address as the forwarding address for a subsequent reply message Messaging Protocol Between the Onboard Satellite Communication System and the Peripheral Device It is up to the peripheral device to maintain a timeout for reception of a response for a given message.

Every messaging transaction must complete (with failure or success) before a new one is initiated.

All methods described herein can be performed in any suitable order unless otherwise indicated herein or otherwise clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Advantages of the exemplary embodiments described herein may be realized and attained by means of the instrumentalities and combinations particularly pointed out in this written description. It is to be understood that the foregoing general description and detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A system for communicating between an aircraft and a base station, the system comprising: a programmable peripheral device programmed to directly control a satellite communications phone in an aircraft without the assistance of an on-board server, the programmable peripheral device comprising software, a software keypad, and a messaging tool; a satellite; and the base station, wherein the satellite communications phone is programmed to send commands and transfer data between the satellite communication device and
   the satellite, and the satellite is configured to transfer data between the satellite and the base station.

2. The system of claim 1, wherein the programmable peripheral device further comprises an extensible protocol for data transfer directly to the satellite communications phone, including messaging, texting, and Short Message Service (SMS).

3. The system of claim 2, wherein the extensible data transfer protocol provides for canned messages, form messages and hybrid messages to decrease the size of transmitted data.

4. The system of claim 3, wherein the peripheral device communicates to the satellite communications phone sending commands to the satellite communications phone and sending data to and receiving data from the satellite communications phone.

5. The system of claim 4, wherein the aircraft is a helicopter.

6. The system of claim 4, wherein the commands include commanding the satellite communication phone to trigger an emergency tracking mode.

7. A system for communicating between an aircraft and a base station, the system comprising: a programmable peripheral device; an onboard satellite communication device; a satellite; and the base station, wherein the peripheral device is programmed to send commands and data to the onboard satellite communication device and to receive data from the onboard satellite communication device without the assistance of an on-board server, and comprises software, a software keypad, and a controller for the onboard satellite communication device and wherein the onboard satellite communication device is programmed to send commands and transfer data between the satellite
   communication device and the satellite, the satellite for transferring data between the satellite and the base station.

8. The system of claim 7, wherein the peripheral device is a smart phone or a tablet computer.

9. The system of claim 7, wherein the peripheral device communicates to the onboard satellite communication device sending commands to the onboard satellite communication device and sending data to and receiving data from the onboard satellite communication device using firmware or software in the peripheral device.

10. The system of claim 9, further comprising a Global Positioning Satellite (GPS), wherein the programmable peripheral device is programmed to utilize GPS data and send commands to the satellite communication device.

11. The system of claim 10, wherein the programmable peripheral device is programmed to command the satellite communication device to trigger an emergency tracking mode.

12. The system of claim 11, wherein the satellite communication device is a satellite communications phone.

13. A method of communicating between an aircraft and a base station, the method comprising:
   employing a programmable peripheral device comprising software or firmware, a software dialer and
   messaging head to control a satellite communication device, without the assistance of an on-board server;
   transferring data directly between the peripheral device and the satellite communication device;
   transferring data between the satellite communication device and a satellite;
   transferring data between the satellite and the base station; and
   decoding the data.

14. The method of claim 13, wherein at least some of the data are transmitted from the peripheral device as canned messages or form messages.

15. The method of claim 13, wherein the peripheral device controls the satellite communication device, and transfers data directly with the satellite communication device via WiFi with a serial dongle.

16. The method of claim 13, further comprising the programmable peripheral device storing at least one form.

17. The method of claim 16, further comprising upgrading the at least one form in the programmable peripheral device.

18. The method of claim 17, further comprising the programmable peripheral device commanding the satellite communication device to trigger an emergency tracking mode.

19. The method of claim 18, wherein the satellite communication device is a satellite communications phone.

20. A system including: i) a peripheral device comprising a non-transitory computer-readable medium, having stored thereon a computer program for data communication, the computer program having a plurality of protocols, the protocols being extensible, the protocols executable by a processor to cause the peripheral device to perform the steps of: directly controlling a satellite communication device; directly dialing the satellite communication device; sending data directly to the satellite communication device; and receiving data from the satellite communication device, each of said steps being performed without the assistance of an on-board server; ii) the satellite communication device; iii) a satellite; and iv) a base station, wherein the satellite communication device is programmed to send commands and transfer data between the satellite communication device and the satellite, the satellite for transferring data between the satellite and the base station.

* * * * *